(12) United States Patent
Paulsen et al.

(10) Patent No.: US 6,866,743 B2
(45) Date of Patent: *Mar. 15, 2005

(54) CONTROLLED STRUCTURE POLYURETHANE PREPOLYMERS FOR POLYURETHANE STRUCTURAL ADHESIVES

(75) Inventors: Evelyn Jennifer Lin Paulsen, Macungie, PA (US); Andrea Karen Smith, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/833,453

(22) Filed: Apr. 12, 2001

(65) Prior Publication Data

US 2003/0024639 A1 Feb. 6, 2003

(51) Int. Cl.$^7$ .................................................. C09J 5/00
(52) U.S. Cl. ......................... 156/331.4; 156/331.7; 525/453; 528/59
(58) Field of Search ............... 156/331.4, 331.7; 525/453; 528/59

(56) References Cited

U.S. PATENT DOCUMENTS

| | | | |
|---|---|---|---|
| 3,384,624 A | * | 5/1968 | Heiss ........................ 528/59 |
| 3,714,127 A | | 1/1973 | Fabris et al. |
| 3,935,051 A | | 1/1976 | Bender et al. |
| 4,169,175 A | * | 9/1979 | Marans et al. ................ 528/59 |
| 4,336,298 A | | 6/1982 | Schwarz |
| 4,385,132 A | | 5/1983 | Gruber et al. |
| 4,444,976 A | | 4/1984 | Rabito |
| 4,728,710 A | | 3/1988 | Goel |
| 4,923,756 A | | 5/1990 | Chung et al. |
| 5,002,806 A | | 3/1991 | Chung |
| 5,075,407 A | * | 12/1991 | Cody et al. .................... 528/71 |
| 5,143,996 A | | 9/1992 | Chung et al. |
| 5,175,228 A | | 12/1992 | Wang et al. |
| 5,202,001 A | | 4/1993 | Starner et al. ................ 203/49 |
| 5,508,111 A | | 4/1996 | Schmucker |
| 5,880,167 A | * | 3/1999 | Krebs et al. ................ 521/155 |
| 5,955,199 A | | 9/1999 | Johnson et al. |
| 6,180,744 B1 | * | 1/2001 | Taylor et al. ................... 528/59 |
| 6,280,561 B1 | * | 8/2001 | McInnis et al. .......... 156/331.4 |
| 2003/0009049 A1 | | 1/2003 | Smith et al. |

FOREIGN PATENT DOCUMENTS

| | | |
|---|---|---|
| DE | 10030908 | 2/2001 |
| EP | 0279566 | 12/1993 |
| EP | 0 392 788 B1 | 3/1997 |
| EP | 0827995 | 11/1998 |
| GB | 2085902 | 5/1982 |
| JP | 8176252 A | 7/1996 |
| WO | WO 01/40340 A2 | 6/2001 |

OTHER PUBLICATIONS

Airthane ® Polyurethane Prepolymers Product Lines, pp. 1–2.*

European Search Report 02008125.3–2115, dated Jul. 26, 2002.

* cited by examiner

Primary Examiner—Sam Chuan Yao
(74) Attorney, Agent, or Firm—Michael Leach

(57) ABSTRACT

A structural polyurethane adhesive composition comprising a polyurethane reaction product and a curative for isocyanate groups, characterized in that the polyurethane reaction product consists essentially of at least 80 wt % perfect prepolymers and less than 2 wt % free isocyanate monomer.

8 Claims, No Drawings

CONTROLLED STRUCTURE POLYURETHANE PREPOLYMERS FOR POLYURETHANE STRUCTURAL ADHESIVES

FIELD OF THE INVENTION

This invention relates to polyurethane structural adhesives comprising a controlled structure isocyanate terminated prepolymer.

BACKGROUND OF THE INVENTION

More sophisticated production and new applications demand that adhesives deliver increased performance and stronger, more resistant bonds. For example, the adhesive may be required to adhere to poorly prepared, contaminated substrates without a primer. They may also be expected to display non-sag properties upon application to vertical surfaces, have rapid green strength development, and form bonds that can withstand elevated temperature exposure.

Polyurethane structural adhesives have been used for many years in industry to adhere substrates like fiberglass reinforced polyesters (FRP). U.S. Pat. No. 3,936,051 discloses typical commercially available polyurethane structural adhesives. The typical adhesive comprises an isocyanate functional component, e.g. a polyurethane prepolymer, and a curing agent. The prepolymer component is the reaction product of polypropylene glycol and toluene diisocyanate, and the curative is a blend of polypropylene ether glycol and N,N,N',N'-tetrakis (2-hydroxypropyl) ethylene diamine. These adhesives are well known for their good flexibility and ability to adhere difficult substrates like FRP. They are also known for superior bonding of dissimilar substrates like FRP to cold rolled steel (CRS).

A common approach to improving adhesive properties is to focus on the curative component of the two component (2K) urethane adhesive system. The objective of many of these innovations is to impart non-sag properties to the applied adhesive. Non-sag adhesives can be applied to substrates in a vertical position without the adhesive dripping or sagging before the second substrate is placed over the adhesive.

U.S. Pat. No. 3,714,127 discloses the addition of di- and multi-primary amines to a 2K polyurethane-based adhesive to impart sag resistance.

U.S. Pat. No. 4,336,298 discloses the addition of para- or ortho-phenylene diamine to a curative blend to improve sag resistance of an adhesive system for bonding fiberglass reinforced polyester (FRP) panels.

U.S. Pat. No. 5,508,111 discloses the use of aryl or aromatic amines, like 1,8-napthalene diamine, in polyurethane adhesives for good sag properties.

U.S. Pat. No. 4,444,976 discloses secondary diamines can also be added to a curative for a 2K polyurethane adhesive to give non-sag properties.

U.S. Pat. No. 5,002,806 discloses a mixed curative containing a slow and fast reacting diamine for sag resistance in 2K structural primerless urethane adhesives.

Another approach is to add special additives to enhance the adhesive performance. U.S. Pat. No. 5,955,199 discloses the use of polyaldimine or polyketimine in the curative component of a 2K urethane structural adhesive.

U.S. Pat. No. 4,728,710 discloses the use of bicyclic amide acetals in an antifoaming 2K polyurethane adhesive.

U.S. Pat. No. 5,175,228 discloses a 2K polyurethane composition in which the prepolymer component contains a primary hydroxyl intermediate and has a sufficiently large excess of free isocyanate so that the ratio of free NCO groups in the prepolymer component to OH curative groups plus any amine groups in the curative component is from about 1.2 to about 2.0.

EP 0 279 566 discloses better adhesion to sheet molding compound (SMC) by incorporating a graft copolymer of poly(alkylene oxide) polyol and a vinyl monomer into a 2K polyurethane adhesive formulation.

U.S. Pat. Nos. 4,923,756 and 5,143,996 disclose the addition of small amounts of aliphatic polyisocyanates, like m-xylylene diisocyanate, promote primerless adhesion.

The current polyurethane structural adhesive patent art does not fully exploit the benefits of controlling the structure of polyurethane prepolymers. Current prepolymers specified in these patents are typically produced from the reaction of a polyisocyanate with a polyol in a 2:1 equivalents ratio. The manufacturer may change the type of polyisocyanate or polyol, but the ratio, and therefore the prepolymer distribution (2:1 adducts, 3:2 adducts, etc.) remains unoptimized. Instead, optimization often focuses, as illustrated by the previous patents, on the composition of the curative and different additives that are added to the formulation.

EP 0 827 995 discloses hot melt adhesives comprising a polyisocyanate prepolymer prepared by reacting a polyisocyanate with a functionality of at least 2 with a polyol with a functionality of at least 2, the reaction product comprising at least 90 wt % "perfect" prepolymer and less than 2 wt % unreacted isocyanate monomer and the prepolymer having a free NCO functionality ranging from 0.2 to 8 wt %.

A great deal of work has gone into improving two component polyurethane structural adhesive formulations through improvements in curative, primers, surface treatment and addition of various additives. However, tailoring of the chemical composition of the isocyanate functional component, or prepolymer, has yet to be fully explored as a means to improve the properties and performance of polyurethane structural adhesives. We have found unexpected advantages in using controlled isocyanate terminated prepolymers that contain controlled levels of residual isocyanate monomer and oligomer content.

SUMMARY OF THE INVENTION

The present invention is directed to a non-solid polyurethane structural adhesive composition comprising a controlled structure isocyanate terminated prepolymer composition having controlled, low levels of residual isocyanate monomer and oligomer content and a curative for isocyanate groups. The residual, or free, isocyanate monomer content is less than 2 wt % of the prepolymer composition.

The prepolymer composition composing the urethane structural adhesive composition is the product resulting from the reaction of a polyester or polyether polyol containing "n" (at least 2) OH groups and a polyisocyanate. The polyisocyanate prepolymer reaction product comprises oligomers and "perfect" prepolymers. The requisite low oligomer content of the prepolymer composition is $\leq 20$ wt % or, reciprocally, can expressed in terms of its "perfect" prepolymer content which should be $\geq 80$ wt %. A "perfect" prepolymer in terms of stoichiometry is a prepolymer of n polyisocyanate molecules and one polyol molecule. The stoichiometric proportions for the polyisocyanate and polyol in the reaction products are 2:1 in the case of diols and 3:1 for triols. The perfect prepolymer is essentially an adduct containing only one molecule of the polyol in each prepolymer molecule. The invention requires that this polyisocyanate prepolymer reaction product (1) consists essentially of at least 80 wt % of a stoichiometric "perfect" prepolymer and (2) contains less than 2 wt % unreacted polyisocyanate monomer.

By "structural adhesive" we mean a load bearing adhesive, i.e., an adhesive that hardens to afford a relatively high modulus and high strength and may be used to join relatively rigid substrates so that a truly load bearing joint is constructed. Structural adhesives differ from laminating adhesives which are non-load bearing and from hot melt adhesives which are solid materials that are melted at elevated temperatures and applied in liquid form to the substrate.

Also provided is a method for adhesively joining or sealing two substrates using such structural polyurethane adhesive composition. The method generally comprises (1) applying onto a substrate a non-solid urethane structural adhesive composition comprising the controlled structure polyisocyanate prepolymer reaction product having the defined low levels of oligomers and free isocyanate monomer and a crosslinking agent, and (2) contacting the adhesive composition disposed on the substrate to a second substrate such that a bond is formed.

"Non-solid" includes pastes and viscous liquids.

Advantages associated with the use of such controlled structure isocyanate prepolymers include an ability to formulate structural adhesives that show improved cured adhesive strength for bonding sheet molding compound compared to those formulated using conventionally prepared isocyanate terminated prepolymers, an ability to formulate structural adhesives demonstrating improved ultimate adhesive strength an ability to formulate structural adhesives showing improved ambient, or room, temperature development of strength the ability to tailor oligomer content and monomer content for controlling properties like viscosity, processability, and the health and safety benefits associated with lower levels of volatile diisocyanate monomer content.

DETAILED DESCRIPTION OF THE INVENTION

This invention relates to the use of certain polyurethane prepolymer compositions in structural adhesives. These prepolymers are controlled structure polyurethane prepolymers comprising the reaction product of a polyisocyanate (A) having a functionality (f) of at least two, with a polyester or polyether polyol (B) of functionality (f) $\geq 2$. The prepolymer reaction product should contain prepolymer-NCO content ranging from 0.2 to 15 wt %. (The molecular weight distribution, i.e. distribution of perfect prepolymer to high order oligomers, is controlled in these prepolymer compositions, as well as the amount of free isocyanate monomer content.) Thus the prepolymer compositions contain prepolymer-NCO content ranging from 0.2 to 15 wt % and less than 2 wt %, preferably less than 0.5 wt %, unreacted isocyanate monomer. At least 80 wt %, preferably 90 wt %, and most desirably 95 wt %, of the prepolymer reaction product obtained by the reaction of the polyisocyanate with the polyol should comprise a "perfect" prepolymer.

A "perfect" prepolymer, or adduct is the perfect endcapping product of polyol B with nA (n polyisocyanate molecules), where n=the functionality (f) of B. For a difunctional B (n=2), the perfect prepolymer is represented as A:B:A. Oligomers are any species with a composition greater than the perfect 2:1 molecular ratio (A:B:A), for example 3:2 (A:B:A:B:A) or 4:3 (A:B:A:B:A:B:A). For a trifunctional B (n=3), the perfect prepolymer is represented as B:3A. Oligomers in this instance are any species with a composition greater than the perfect 3:1 molecular ratio.

For example, Airthane® prepolymers marketed by Air Products and Chemicals, Inc. are controlled structure prepolymer compositions. These prepolymer compositions based on TDI and IPDI contain >90 wt % perfect 2:1 prepolymer, i.e., <10 wt % oligomer, and <0.1 wt % residual monomeric isocyanate.

The urethane structural adhesive composition used in the present method comprises an NCO-terminated urethane prepolymer (also called a polyisocyanate prepolymer) prepared by reacting a polyisocyanate having an NCO functionality of at least 2 with a polyol, preferably performing the reaction in an NCO to active hydrogen equivalent ratio of $\geq 4:1$, preferably, 6–10:1. The unreacted polyisocyanate monomer in the prepolymer reaction product is removed by distillation or other treatment to a concentration of less than 2%, preferably, less than 0.1%. The prepolymer reaction product should contain free isocyanate, i.e., prepolymer-NCO content, ranging from 0.2 to 15 wt %, preferably, 0.5 to 8 wt %.

Such prepolymers useful in the structural adhesive composition may be prepared according to the teachings of U.S. Pat. Nos. 4,786,703 and 5,202,001, which disclosures are incorporated by reference.

The prepolymer reaction products are prepared using suitable organic polyisocyanates well known in the art including, for example, hexamethylene diisocyanate, phenylene diisocyanate, toluene diisocyanate (TDI), 4,4'-diphenylmethane diisocyanate (MDI), isophorone diisocyanate (IPDI) and bis-(4-isocyanatocyclohexyl) methane. Especially suitable are the 2,4- and 2,6-TDIs individually or together as their commercially available mixtures with the percentages being from about 65–100% of the 2,4- and 0–35% of the 2,6-isomer by weight. Other suitable isocyanate mixtures of diisocyanates known commercially as "crude MDI", also known as PAPI, which contain about 60% MDI along with other isomeric and analogous higher polyisocyanates.

Polyether and polyester polyols are commonly used in the preparation of polyurethane prepolymers. The hydroxyl-terminated polyethers are typically polyalkylene ether glycols, such as poly(ethylene ether) glycol, poly(propylene ether) glycol and polytetramethylene ether glycol. Other polyethers are prepared by the copolymerization of cyclic ethers, such as ethylene oxide, propylene oxide and trimethylene oxide with various aliphatic diols such as ethylene glycol, butane diols, e.g., 1,3- and 1,4-butane diols, and the like. Polyester polyols can also be used for producing the polyurethane prepolymers, and these would include hydroxyl terminated polyesters such as ethylene adipate, polypropylene adipate, polyhexamethylene adipate and copolyesters prepared by copolymerizing ethylene glycol and propylene glycol with the above polyesters, which include poly(1,4-butylene-ethylene) adipate and poly(1,4-butylene-propylene) adipate.

The above polyether and polyester polyols are conventional for producing polyurethane prepolymers and can be blended such that the polyol composition (single or blend) used in making the prepolymer typically has an average Mn ranging from about 1000 to 60,000, and typically from 4200 to about 25,000.

In the preferred prepolymer synthesis, it is important to maintain a high equivalent ratio of TDI to the polyol, e.g., a range from 4 to 20:1. As the level of TDI to polyol approaches 4:1 and then stoichiometric, greater quantities of higher molecular weight oligomers are formed which detract from the performance characteristics of the urethane prepolymer adhesive composition. Preferably, the equivalent ratio of TDI to polyol in the reaction is from 6 to 10:1 equivalents of TDI to polyol to produce oligomers at less than 20 wt %, preferably less than 10 wt %.

Maintaining a high equivalent ratio of feed TDI to polyol is extremely important because when the equivalent ratio of TDI to polyol is lowered to slightly above stoichiometric, e.g., 10% excess, which is conventional, oligomers are formed. Higher oligomer formation results in lower performance properties and higher prepolymer viscosity.

In addition to the polyisocyanate prepolymer, the urethane structural adhesive composition contains a curative composition as is well known in the art. Suitable curatives comprise diamines, polyols, or blends thereof, as well as optional catalyst, thickening agent, or drying agent. Examples of diamines include both aromatic and aliphatic diamines, primary and secondary amine terminated polyether polyols, and difunctional, trifunctional, and polymeric amines. Examples of polyols include polyester or polyether polyols, which can be diols, triols and tetrols, having primary, secondary and/or tertiary alcohol groups. These polyols may be mixed with the diamines. Optional catalysts include tertiary amine catalysts and suitable organometallic catalysts, such as those derived from tin, zirconium, and bismuth. Other optional additives include thickening, coloring and drying agents.

(Substrates that may be bonded with the adhesive include cold rolled steel, aluminum, fiberglass reinforced polyester (FRP), sheet molding compound (SMC), ABS, PVC, polycarbonate, polypropylene, TPO, wood, and glass.)

The following materials were used in the Examples:
Arcol® PPG 2025, from Bayer Corp.
Quadrol® polyol from BASF Corp.
Microtuff 325F talc from Barretts Minerals Inc.
Cab-o-sil TS 720 fumed silica from Cabot Corp.
Aluminum Powder, 325 Mesh, Grade 101 from Toyal America Inc.
Microbeads (10 mil and 20 mil) from Cataphote.
Zinc coated cold rolled steel (Zn CRS) from ACT Laboratories, Inc.
Sheet molding compound (SMC)—GC7113—from GenCorp.

Polyurethane prepolymers shown in Table 1

TABLE 1

| Prepolymer | Isocyanate | Polyol | % NCO | Residual Diisocyanate (wt %) | % Oligomer |
| --- | --- | --- | --- | --- | --- |
| 1 | MDI | PPG-Based | 6.6 | 0.4 | 8 |
| 2 | MDI | PPG-Based | 6.6 | >5 | >50 |
| 3 | MDI | PPG-Based | 6.7 | 0.6 | 4 |
| 4 | MDI | PPG-Based | 6.5 | >5 | >50 |
| 5 | TDI | PPG-Based | 7.47 | <0.1 | <1 |
| 6 | TDI | PPG-Based | 7.80 | 2.2 | 25 |

EXAMPLE 1

This example shows that structural adhesives exhibiting high ultimate strength on sheet molding compound (SMC) can be prepared with prepolymer compositions according to the invention.

The following structural adhesive composition was used in the runs:

| Part A | wt % | Part B | wt % |
| --- | --- | --- | --- |
| Prepolymer | 60 | Arcol ® PPG2025 | 16.7 |
| Aluminum Powder | 38 | Quadrol ® | 33.3 |
| Cab-o-sil TS720 | 2 | Microtuff 325F | 27 |
| | | Cab-o-sil TS720 | 1 |
| | | Aluminum Powder | 22 |

The adhesive was prepared by mixing Part A and Part B in a NCO:OH ratio of 1:0.9 while adding 1 wt % of microbeads (10 mil for CRS substrate, 20 mil for SMC substrate). The adhesive mixture was then applied to one side of a 1"×4" (2.54×10.16 cm) substrate coupon to cover at least 0.5 in$^2$ (3.23 cm$^2$) of area then mated with a second substrate coupon to give a total lapshear overlap of 0.5 in$^2$ (3.23 cm$^2$). Sample was cured at room temperature and 50% humidity. Samples prepared and tested for lap shear strength according to ASTM D1002 after 1 day and 7 days. All tested done at room temperature (RT).

TABLE 2

| Prepolymer | Substrate | Cure | Shear strength (psi) after 1 day | Shear strength (psi) after 7 day |
| --- | --- | --- | --- | --- |
| 5 | SMC | RT | 614 (92) | 701 (79) |
| 6 | SMC | RT | 486 (69) | 526 (72) |
| 5 | SMC | Heat* | 656 (92) | 643 (32) |
| 6 | SMC | Heat* | 475 (25) | 425 (17) |

*Heat cured at 120° C., 30 min; aged at room temperature

The data in Table 2 shows that Prepolymer 5 according to the invention gave superior shear strength to Prepolymer 6 after room temperature curing and aging for 1 day and 7 days as well as after heat cure (120° C., 30 min) then room temperature aging for 1 day and 7 days.

EXAMPLE 2

This example shows the that structural adhesives exhibiting fast room temperature cure on zinc cold rolled steel (Zn CRS) can be prepared with prepolymer compositions according to the invention.

The structural adhesive formulation and procedure used in this Example was the same as that of Example 1.

TABLE 3

| Prepolymer | Cure | Shear strength (psi) after 1 day | Shear strength (psi) after 7 day | % cure (1 d/7 d) |
|---|---|---|---|---|
| 1 | RT | 1324 | 1617 | 82 |
| 2 | RT | 874 | 1684 | 52 |
| 3 | RT | 1240 | 1452 | 85 |
| 4 | RT | 981 | 1367 | 72 |

The structural adhesives containing Prepolymers 1 and 3 according to the invention showed faster room temperature development of strength after 1 day (% cure (1d/7d) than those containing prepolymer 2 and 4 compositions.

STATEMENT OF INDUSTRIAL APPLICATION

The invention provides an improved structural polyurethane adhesive.

We claim:

1. In a non-solid structural polyurethane adhesive composition comprising a polyurethane prepolymer reaction product of a polyisocyanate and a polyol composition and a curative for isocyanate groups, the improvement which comprises a polyurethane prepolymer reaction product of a polypropylene glycol-based polyol and a polyisocyanate which is toluene diisocyanate or 4,4'-diphenylmethane diisocyanate and consisting essentially of at least 80 wt % perfect prepolymers and less than 2 about 0.6 wt % free diisocyanate monomer.

2. The structural adhesive of claim 1 in which the polyurethane prepolymer reaction product consists essentially of at least 90 wt % perfect prepolymers.

3. The structural adhesive of claim 1 in which the polyurethane prepolymer reaction product consists essentially of less than 0.5 wt % free diisocyanate monomer.

4. The structural adhesive of claim 1 in which the polypropylene glycol-based polyol is a polyether polyol or a polyester polyol.

5. A method for adhesively joining or sealing two substrates using a structural polyurethane adhesive composition which comprises applying onto a substrate the non-solid structural polyurethane adhesive composition of claim 1, and contacting the adhesive composition disposed on the substrate with a second substrate such that a bond is formed.

6. The method of claim 5 in which the polyurethane prepolymer reaction product consists essentially of at least 90 wt % perfect prepolymers.

7. The method of claim 5 which the polyurethane prepolymer reaction product consists essentially of less than 0.5 wt % free diisocyanate monomer.

8. The method of claim 5 in which the polypropylene glycol-based polyol is a polyether polyol or a copolyesters polyol.

* * * * *

UNITED STATES PATENT AND TRADEMARK OFFICE
CERTIFICATE OF CORRECTION

PATENT NO. : 6,866,743 B2
DATED : March 15, 2005
INVENTOR(S) : Evelyn Jennifer Lin Paulsen et al.

It is certified that error appears in the above-identified patent and that said Letters Patent is hereby corrected as shown below:

Column 8,
Line 10, delete "polyester" and substitute therefor -- copolyester --
Line 26, delete "copolyesters" and substitute therefor -- copolyester --

Signed and Sealed this

Twenty-fourth Day of May, 2005

JON W. DUDAS
*Director of the United States Patent and Trademark Office*